United States Patent [19]

Oyamada et al.

[11] Patent Number: 5,683,486
[45] Date of Patent: Nov. 4, 1997

[54] METHOD OF FORMING A FIBER PREFORM TO MINIMIZE SHIFTS OF THE ZERO-DISPERSION WAVELENGTH

[75] Inventors: Hiroshi Oyamada; Go Ogino; Hideo Hirasawa, all of Gunma-ken, Japan

[73] Assignee: Shin-Etsu Chemical Co., Ltd., Tokyo, Japan

[21] Appl. No.: 358,529

[22] Filed: Dec. 19, 1994

[30] Foreign Application Priority Data

Dec. 28, 1993 [JP] Japan .................. 5-334420

[51] Int. Cl.$^6$ .................................... C03B 37/027
[52] U.S. Cl. .................. 65/377; 65/378; 65/382; 65/415; 385/127
[58] Field of Search .................... 385/127; 65/378, 65/382, 377, 415, 430

[56] References Cited

U.S. PATENT DOCUMENTS

| | | | |
|---|---|---|---|
| 4,260,221 | 4/1981 | Marcuse | 65/378 |
| 4,406,732 | 9/1983 | Kayoun | 385/127 |
| 4,597,785 | 7/1986 | Karbassiyoon | 65/378 |
| 4,755,022 | 7/1988 | Ohashi . | |
| 5,278,931 | 1/1994 | Antos | 385/127 |
| 5,314,517 | 5/1994 | Koening | 65/382 |

OTHER PUBLICATIONS

Lin, H.Y. et al. "An Efficient Algorithm for Determining the Dispersion Characteristics of Single-Mode Optical Fibers" Journal of Lightwave Technology, Jun. 1992, vol. 10, No. 6, pp. 705-711.

Primary Examiner—John Hoffmann
Attorney, Agent, or Firm—McAulay Fisher Nissen Goldberg & Kiel, LLP

[57] ABSTRACT

An improvement is proposed, in a method for the preparation of a step-index silica glass preform as a precursor of optical fibers by completing the cladding layer of the secondary preform by the outer deposition on and around a primary preform consisting of the center core and side core, to conduct the outer deposition for the cladding layer in such a way that the inequality

$$|d\lambda_0/dk| \leq 500 \text{ nm}$$

is satisfied, in which k is the ratio of the diameter of the primary preform to the diameter of the secondary preform and $\lambda_0$ is the zero-dispersion wavelength in nm of an optical fiber obtained by drawing the secondary preform, $d\lambda_0/dk$ being the differential of a function held between $\lambda_0$ and k determined beforehand from the distribution of the refractive index within the primary preform. When the outer deposition is performed in this way, a great improvement can be obtained in the uniformity of the zero-dispersion wavelength of the optical fiber prepared by drawing the preform.

1 Claim, 11 Drawing Sheets

FIG. 1

$\Delta_1 = 0.91\%$
$\Delta_2 = 0.10\%$
$a_1/a_2 = 0.21$

METHOD OF FORMING A FIBER PREFORM TO MINIMIZE SHIFTS OF THE ZERO-DISPERSION WAVELENGTH

BACKGROUND OF THE INVENTION

The present invention relates to a method for the preparation of a preform as a precursor material of optical fibers. More particularly, the invention relates to an improvement in the method for the preparation of a preform from which fused silica glass optical fibers having excellently stable dispersion characteristics in the longitudinal direction can be obtained by drawing.

As is known, single-mode optical fibers of fused silica glass are used in the long-distance communication service usually with light of a wavelength within the 1550 nm band because the loss in the fused silica glass optical fibers is minimum at a wavelength of around 1550 nm. It is desirable for fused silica glass optical fibers to have a minimum dispersion at a wavelength in the 1550 nm band when they are used for a large-capacity communication service with light in the 1550 nm band.

While the value of dispersion in a single-mode optical fiber is expressed as a total of the material dispersion and the structural dispersion, the structural dispersion heavily depends on the distribution profile of the refractive index, e.g., difference in the specific refractive index and core diameter, of the optical fiber although the material dispersion little depends thereon. In this regard, a so-called dispersion-shift optical fiber is proposed which is an optical fiber having the zero-dispersion wavelength, i.e. the wavelength at which the value of dispersion is zero, shifted into the 1550 nm band.

As to the dispersion-shift optical fibers, Japanese Patent Publication No. 3-18161 discloses a step-wise dispersion-shift optical fiber which is "an optical fiber having zero dispersion in the 1.5 μm band and consisting of a center core, a side core on and around the center core with a refractive index lower than that of the center core and a cladding layer on and-around the side core having a still lower refractive index and having a step-wise cross sectional distribution profile of the refractive index, of which $0<P_1<1$, $0<P_2<1$ and $\Delta_1>0.001$, taking the difference in the specific refractive index between the center core and the cladding layer as $\Delta_1$ equal to $(n_1^2-n_2^2)/2n_1^2$, $n_1$ being the maximum refractive index of the center core and $n_2$ being the refractive index of the cladding layer, the difference in the specific refractive index between the side core and the cladding layer as $\Delta_2$ equal to $(n_3^2-n_2^2)/2n_3^2$, $n_3$ being the maximum refractive index of the side core, the diameter of the center core as $a_1$, the diameter of the side core as $a_2$, $P_1=\Delta_1/\Delta_2$ and $P_2=a_1/a_2$." When the parameters $P_1$, $P_2$ and $\Delta_1$ have values satisfying the above given respective inequalities, the material dispersion and the structural dispersion reportedly cancel each other to give zero dispersion of the optical fiber.

Figure 9:
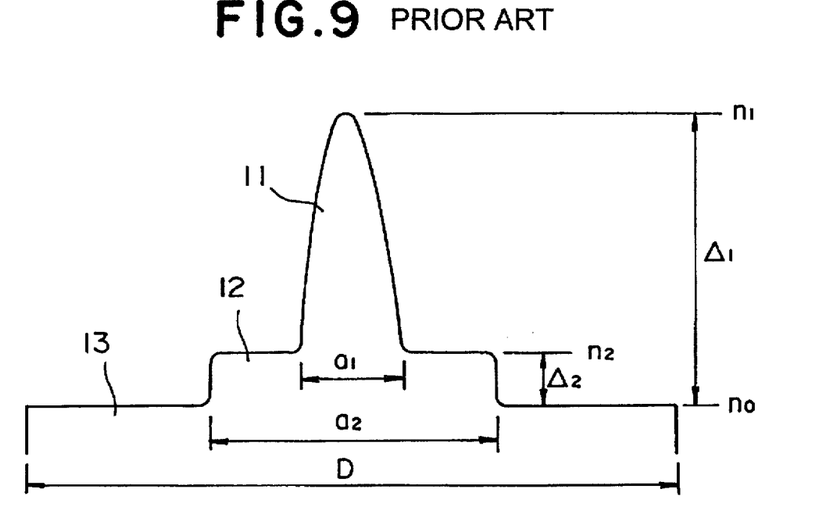
FIG. 9 is a distribution profile of the refractive index of a conventional preform within a radial cross section.

FIG. 9 of the accompanying drawing illustrates a distribution profile of the refractive index within a radial cross section of the above mentioned step-wise dispersion-shift optical fiber in which the center core 11 has a refractive index $n_1$, specific refractive index $\Delta_1$ and diameter $a_1$, the side core 12 has a refractive index $n_2$, specific refractive index $\Delta_2$ and diameter $a_2$ and the cladding layer 13 has a refractive index $n_0$ and diameter D satisfying the inequalities of $n_1>n_2>n_0$ and $a_1<a_2<D$. Any desired dispersion characteristics of a step-wise dispersion-shift optical fiber can be obtained by appropriately selecting the values of these parameters.

Figure 10:
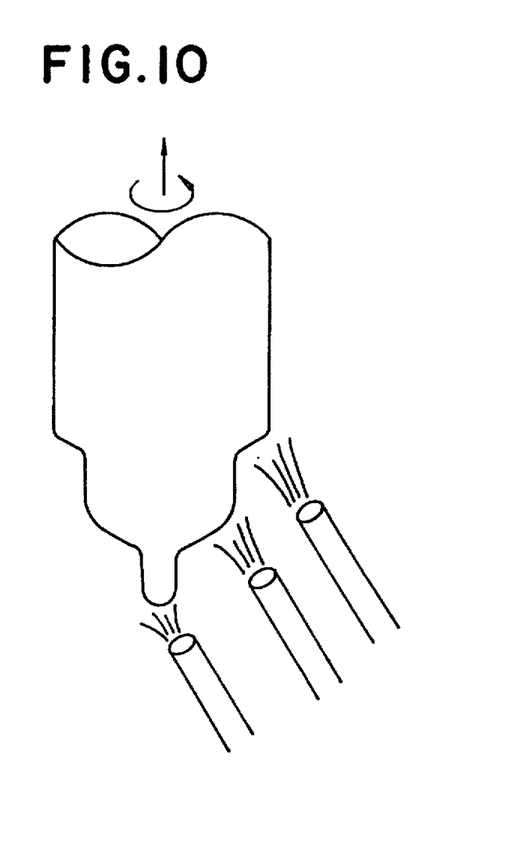
FIG. 10 is a schematic illustration of the procedure for the preparation of a porous body for an optical fiber preform.
Figure 11:
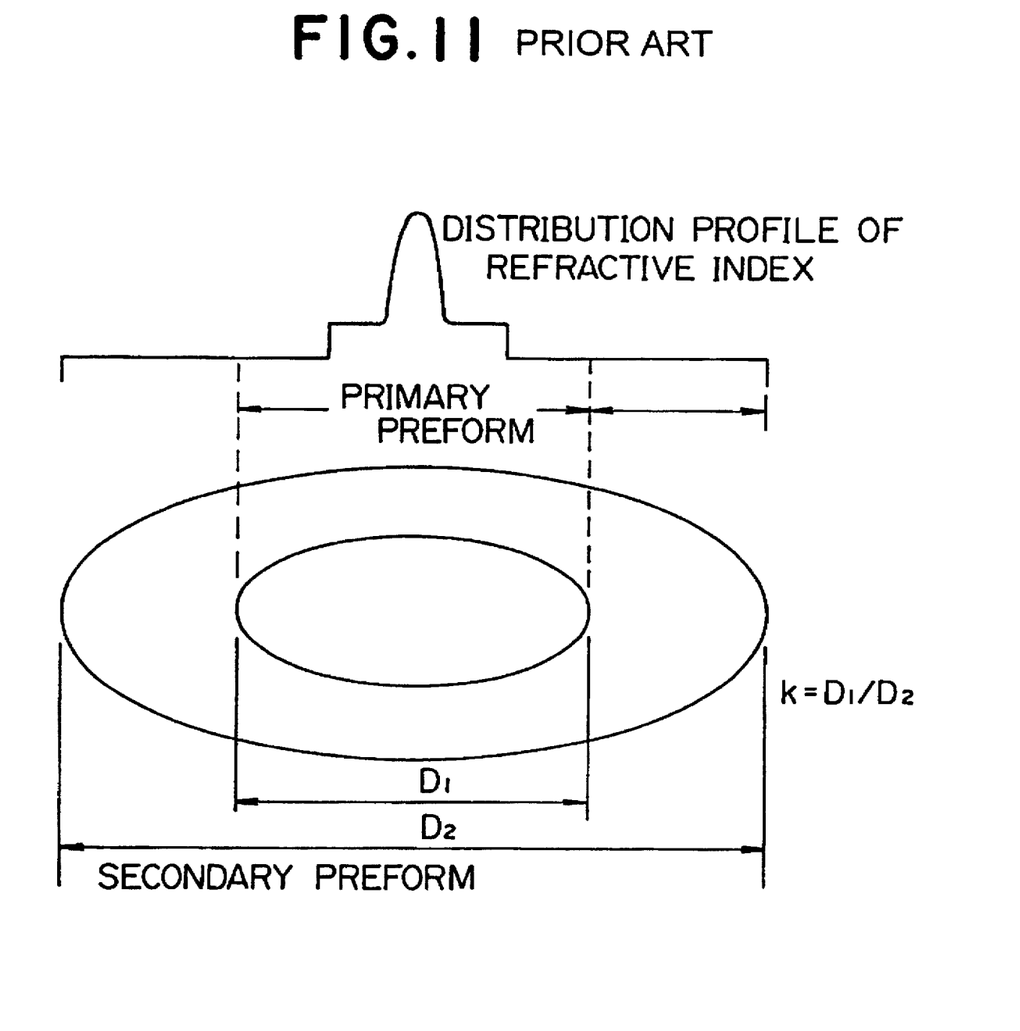
FIG. 11 is a perspective view of a conventional optical fiber preform showing an end surface accompanied by a distribution profile of the refractive index.
Figure 12:
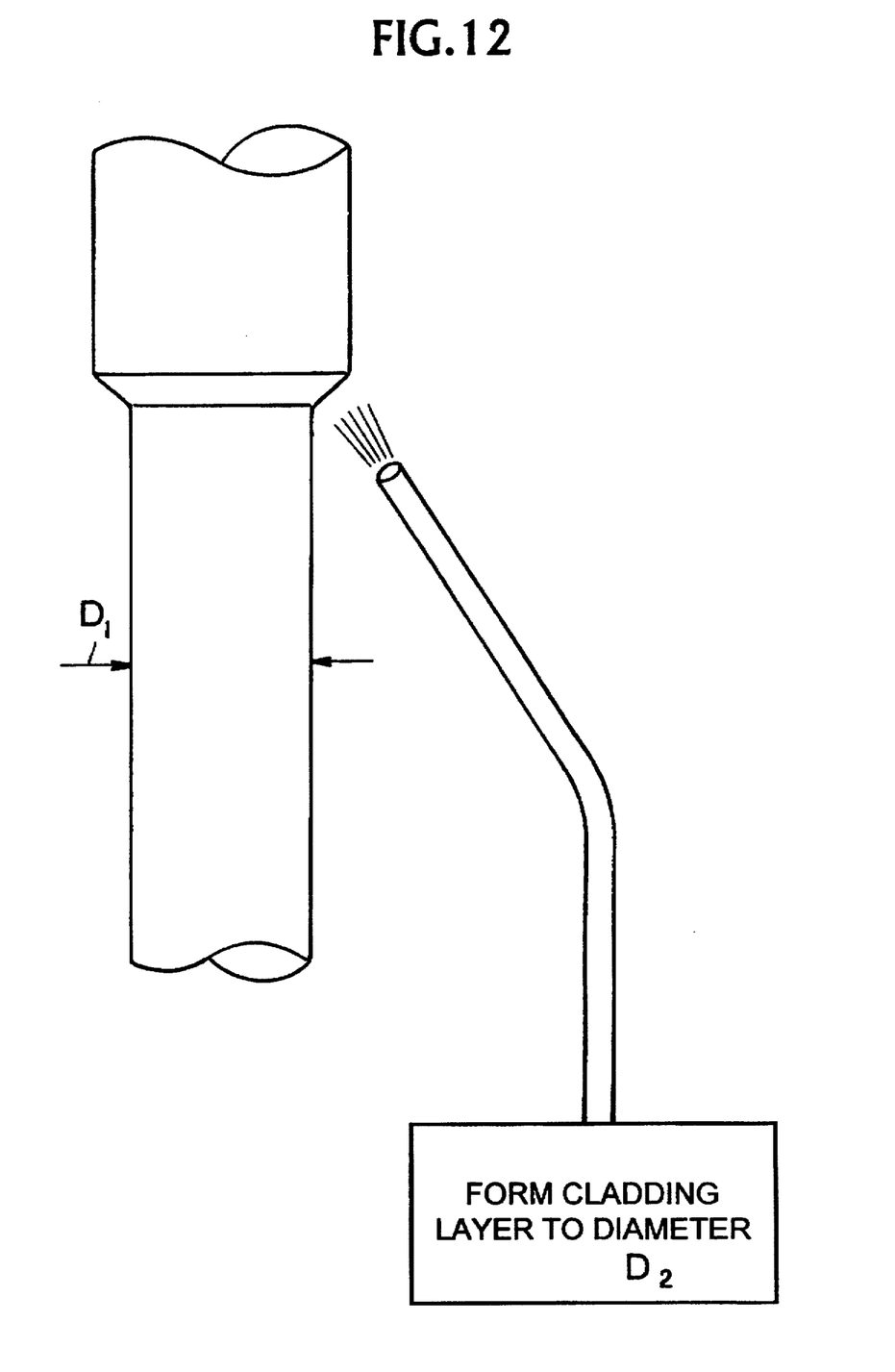
FIG. 12 is a schematic illustration of the procedure for forming a cladding layer of diameter $D_2$ on a primary preform of diameter $D_1$.

The above described step-wise dispersion-shift optical fiber is prepared typically by the so-called VAD method schematically illustrated in FIG. 10, in which a porous preform of fused silica glass consisting of the portions corresponding to the center core, the side core and a part of the cladding layer are formed by using respective oxyhydrogen flame burners followed by a vitrification treatment of the porous glass preform into a transparent primary glass preform having a diameter $D_1$ and, thereafter, a further porous layer having an appropriate thickness is deposited by the so-called outer deposition method on and around the primary preform followed by a second vitrification treatment of the additional porous layer into a transparent silica glass layer to give a secondary preform having a diameter $D_2$ as is illustrated in FIG. 11. This secondary preform can be drawn into a step-wise dispersion-shift optical fiber of a desired diameter having desired properties relative to the parameters such as the cutoff wavelength, mode field diameter and zero-dispersion wavelength.

The desired zero-dispersion wavelength of an optical fiber can be obtained in the following manner. Thus, the distribution profile of the refractive index in the optical fiber is determined and the result is used for obtaining the relationship between the ratio k of the diameter $D_1$ of the primary preform to the diameter $D_2$ of the secondary preform, i.e. $D_1/D_2$, and the zero-dispersion wavelength $\lambda_0$ in nm. The outer deposition of the porous glass layer for the additional cladding layer is performed until the zero-dispersion wavelength determined in the above described manner coincides with the desired wavelength.

The matter in actual cases is not so simple. For example, the primary preform is not uniform in the longitudinal direction but a considerable fluctuation is unavoidable in various parameters therein so that, even if the above mentioned requirement is satisfied as an average over a length of the preform or at one point in the longitudinal direction, the value of k is not uniform enough but subject to a slight but not negligible fluctuation along the longitudinal direction. Besides the above mentioned fluctuation in the primary preform, the additional porous glass layer to complete the cladding layer by vitrification is also not uniform enough along the longitudinal direction relative to the density and thickness resulting in the variation of the value of k along the direction. As a consequence of the above mentioned uncontrollable situations, the actual value of k in the secondary preform is also subject to variation which is sometimes as large as ±0.01% or even larger along the longitudinal direction leading to the variation in the zero-dispersion wavelength amounting ±10 nm or even larger along the longitudinal direction.

Various countermeasures have of course been undertaken heretofore to solve the above mentioned problems including stabilization of the outer diameter of the primary preform in the longitudinal direction, improvement of the uniformity in the thickness of the porous cladding layer additionally deposited by the outer-deposition method and so on but none of the prior art methods can provide a full solution of the problems.

SUMMARY OF THE INVENTION

The present invention accordingly has an object, in view of the above described situations in the prior art, to provide a novel and improved method for the preparation of a fused silica glass-based preform for optical fibers free from the above described problems and disadvantages in the conventional methods of the prior art.

Thus, the present invention provides, in a method for the preparation of a silica glass-based preform for optical fibers comprising the steps of forming a side core of silica glass on and around the center core of silica glass, the refractive index of the silica glass forming the side core being smaller than that of the silica glass forming the center core, to give a primary preform having a diameter $D_1$ and forming a cladding layer of silica glass on and around the primary preform, the refractive index of the silica glass forming the cladding layer being smaller than that of the silica glass forming the side core, to give a secondary preform having a diameter $D_2$, an improvement which comprises form-ing the cladding layer in such a way that the inequality $$|d\lambda_0/dk| \leq 500 \text{ nm}$$

is satisfied, in which k is the ratio $D_1/D_2$ and $\lambda_0$ is the zero-dispersion wavelength in nm of an optical fiber obtained by drawing the secondary preform, $d\lambda_0/dk$ being the differential of a function held between $\lambda_0$ and k determined beforehand from the distribution of the refractive index within the primary preform.

DETAILED DESCRIPTION OF THE PREFERRED EMBODIMENTS

As is understood from the above given description, the invention relates to a method for the preparation of a silica glass-based preform for step-index dispersion-shift preform for optical fibers. The method of the invention for the preparation of an optical fiber preform is performed by first forming a side core of silica glass on and around the center core of silica glass and forming a part of the cladding layer on and around the side core to give a primary preform, the refractive index of the silica glass forming the side core being smaller than that of the center core, and then forming an additional cladding layer of silica glass on and around the primary preform, the refractive index of the silica glass forming the cladding layer being smaller than that of the side core, while the cladding layer is formed in such a controlled way that the inequality $$|d\lambda_0/dk| \leq 500 \text{ nm}$$

is satisfied, each symbol having the meaning as defined before. The principle of this essential requirement can be explained by making reference to FIGS. 1 to 3 of the accompanying drawing.

Figure 1:
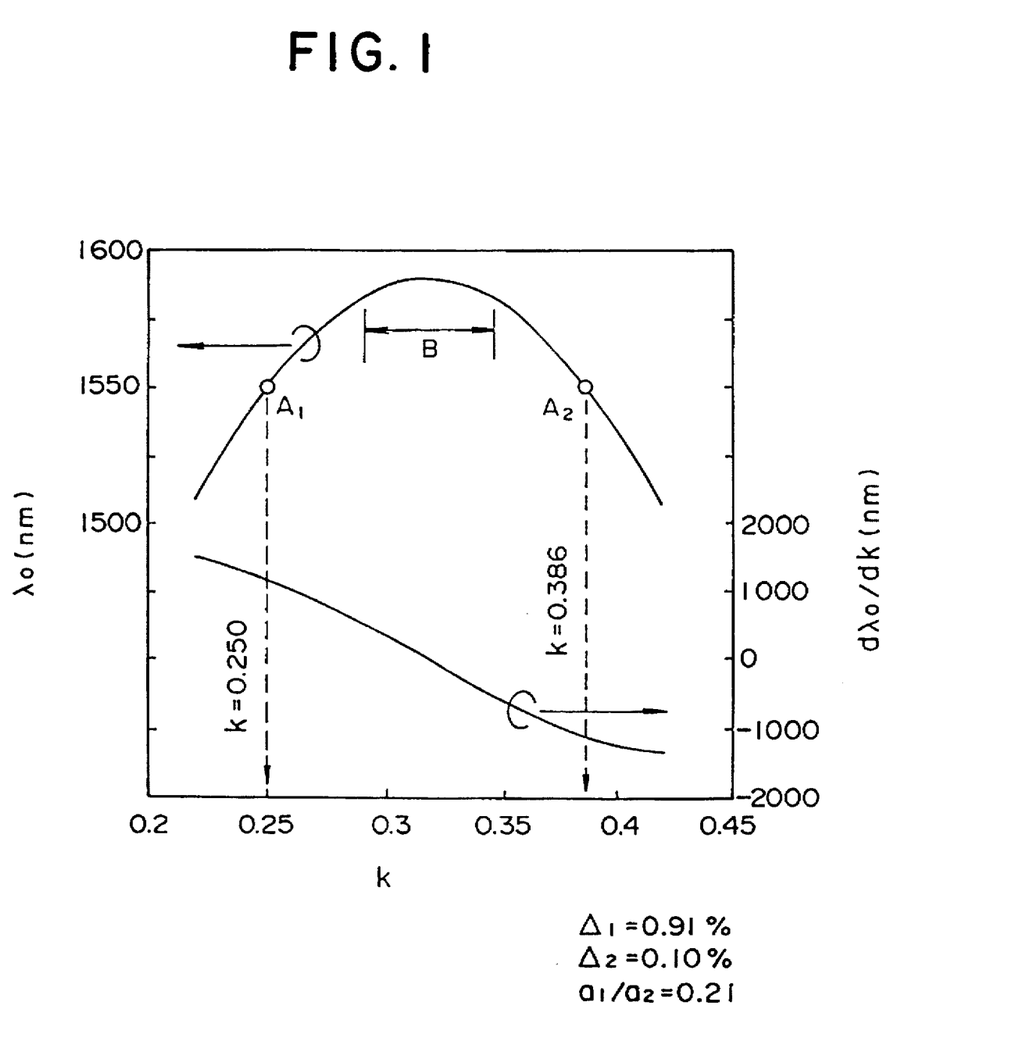
FIG. 1 is a graph for explanation purpose of the invention showing the parameters $\lambda_0$ and $d\lambda_0/dk$ each as a function of the parameter k.

In FIG. 1, the value of the parameter $\lambda_0$ is shown as a function of the value of k in an example. Assuming that the optical fiber is used at a wavelength of 1550 nm, a secondary preform is usually prepared by conducting the outer deposition to form the cladding layer with such a target that the value of k falls either on the point $A_1$ where k=0.250 or on the point $A_2$ where k=0.386. According to Japanese Patent Publication 3-18161 quoted before, the point $A_2$ is preferred to the point $A_1$ in respect of the superior bending characteristics. The value of $d\lambda_0/dk$, which represents the gradient of the $\lambda_0$ vs. k curve, has a so large value of 1158.1 nm at the point $A_1$ and −1090 nm at the point $A_2$ that even a very small fluctuation of ±0.01% in the value of k along the longitudinal direction necessarily results a variation of ±10 nm or even larger in the value of $\lambda_0$.

In FIG. 1, the range indicated by the double-sided arrow B corresponds to the inequality of $|d\lambda_0/dk| \leq 500$ nm. When the thickness of the cladding layer formed by the outer deposition is within this range, the fluctuation in $\lambda_0$ can be ±5 nm or smaller to be well within a permissible range even when the variation in k is as large as ±1% or even larger. When the wavelength of the light used in the optical communication through the optical fiber is equal to $\lambda_0$ and the cladding layer by the outer deposition is formed as mentioned above or, more preferably, to satisfy the equation $d\lambda_0/dk$=0, namely, the optical fiber obtained by drawing the thus prepared preform would exhibit very excellent performance. The coincidence between $\lambda_0$ within the range B and the wavelength of the light for actual optical communication can be easily obtained by adequately selecting the parameters $\Delta_1$, i.e. difference in the specific refractive index of the center core, $\Delta_2$, i.e. difference in the specific refractive index of the side core, and $a_1/a_2$, i.e. ratio of the diameter of center core to the diameter of side core. Following is a description of the way by which these requirements can be satisfied.

Figure 2A:
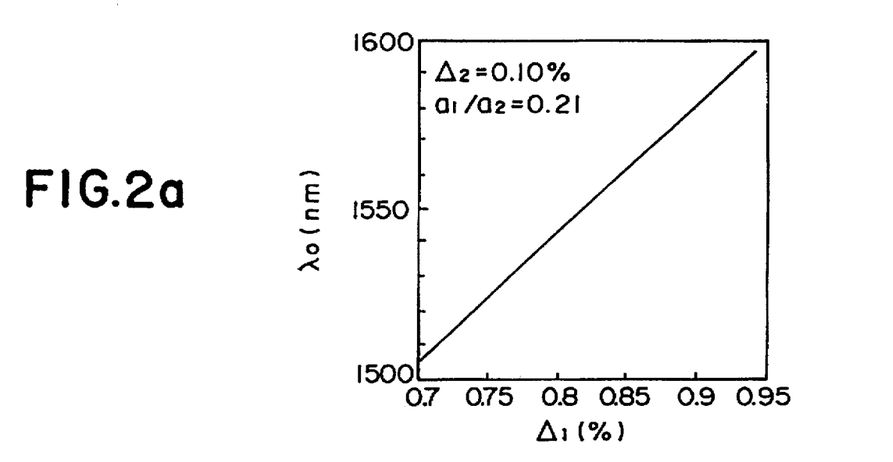
FIGS. 2a, 2b and 2c are each a graph showing the parameter $\lambda_0$ as a function of the parameters $\Delta_1$, $\Delta_2$ and $a_1/a_2$, respectively.
Figure 2B:
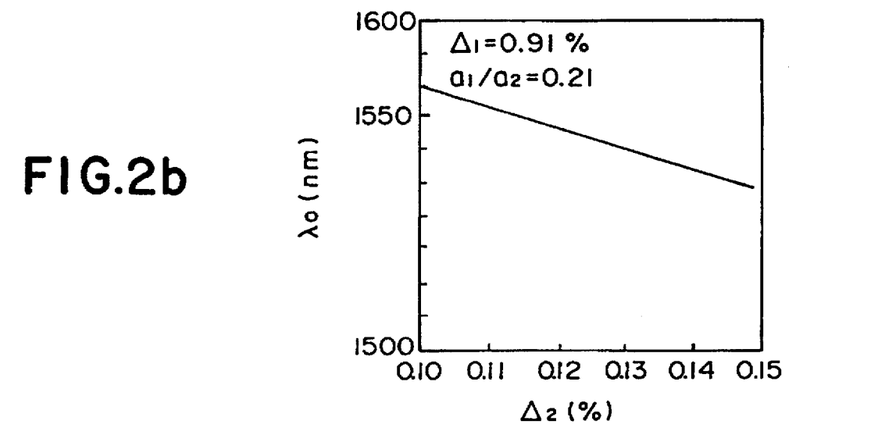
Figure 2C:
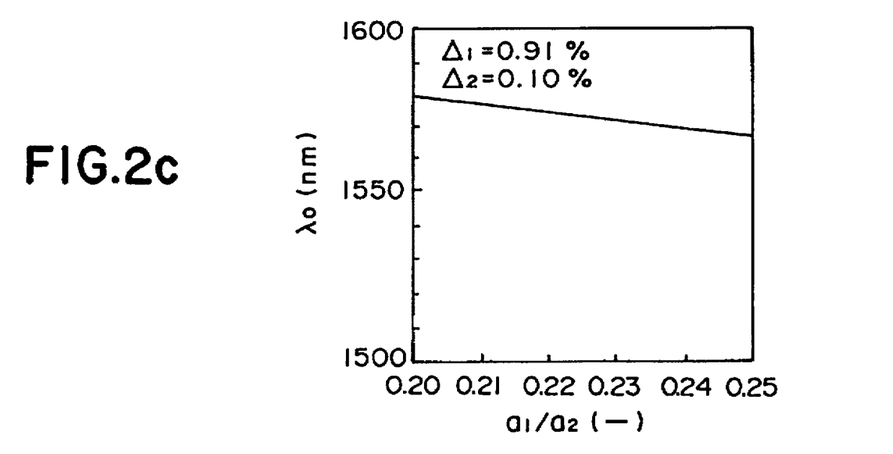

FIGS. 2a, 2b and 2c are each a graph obtained by assessment based on the example appearing in FIG. 1 showing the influences of $\Delta_1$, $\Delta_2$ and $a_1/a_2$ on the zero-dispersion wavelength $\lambda_0$* at the point where $d\lambda_0/dk$=0. Namely, $\lambda_0$* can be easily modified by adequately selecting the values of one or more of the parameters $\Delta_1$, $\Delta_2$ and $a_1/a_2$.

Figure 3:
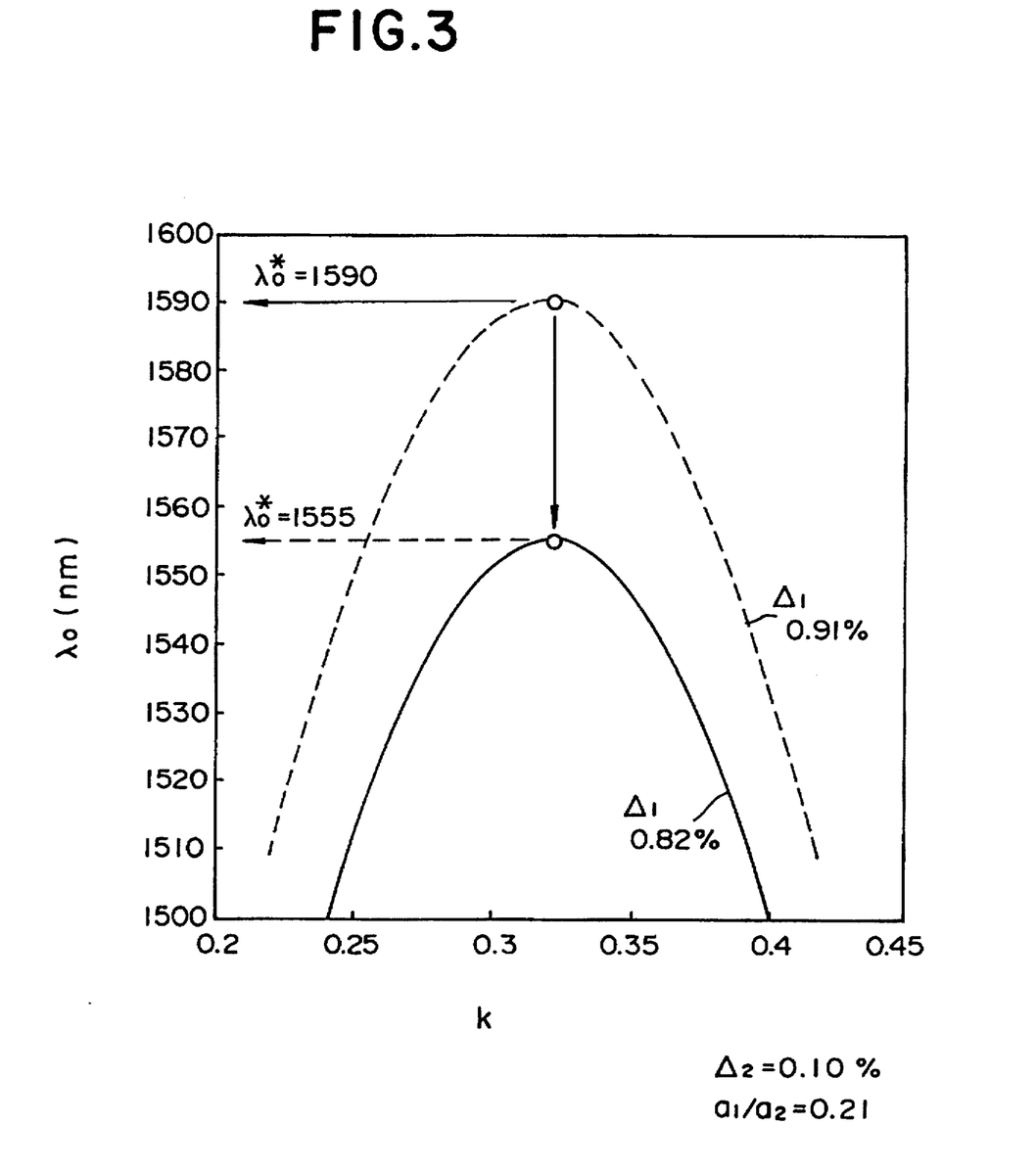
FIG. 3 is a graph showing $\lambda_0$ as a function of k taking $\Delta_1$=0.91% and $\Delta_2$=0.82%.

FIG. 3 shows the shift of the $\lambda_0$ vs. k curve when $\Delta_1$ is changed from 0.91% to 0.82% assuming that $\Delta_2$ and $a_1/a_2$ are each constant at 0.10% and 0.21, respectively. As is shown by the downwardly directed arrow, $\lambda_0$* can be changed from 1590 nm with the $\lambda_0$ vs. k characteristic shown by the broken line curve for $\Delta_1$= 0.91% to 1555 nm with the $\lambda_0$ vs. k characteristic shown by the solid line curve for $\Delta_1$=0.82%. When the target value of k is set at a point where k=0.340 and $d\lambda_0/dk$=−417.6 to satisfy the requirement of $|d\lambda_0/dk| \leq 500$ nm, accordingly, the zero-dispersion wavelength can be just equal to 1550 nm which is the wavelength of the light for the optical communication with a sufficiently small variation of ±4.2 nm in the value of $\lambda_0$ even when the fluctuation of the actual value of k is ±0.01% along the longitudinal direction of the secondary preform.

In the following, the improvement obtained by the present invention is illustrated in more detail by way of examples and a comparative example.

EXAMPLE 1

Figure 4:
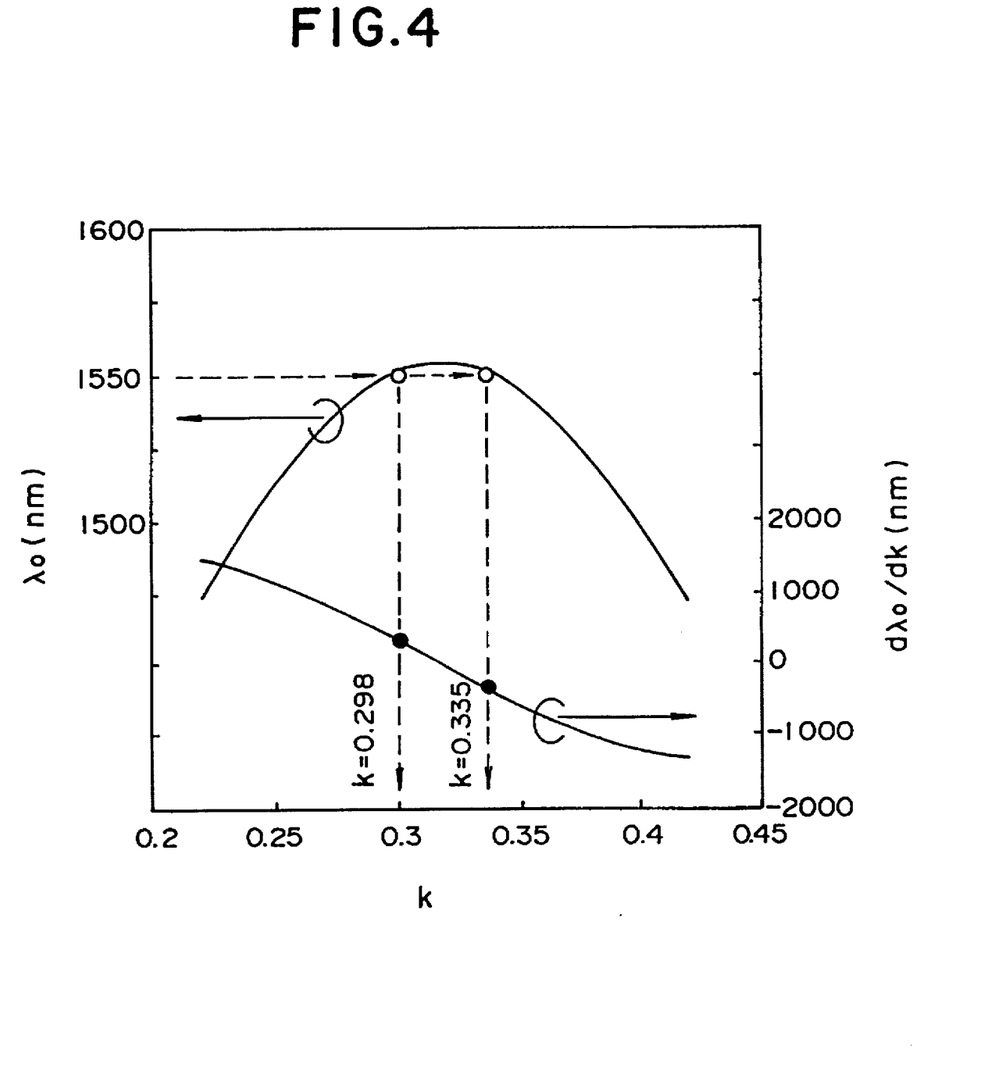
FIG. 4 is a graph showing the parameters $\lambda_0$ and $d\lambda_0/dk$ each as a function of the parameter k in the preform prepared in Example 1.

A primary preform having a controlled distribution profile of the refractive index was prepared on the base of the assessment calculation shown in FIG. 3 by the solid line. The actual values of the parameters $\Delta_1$, $\Delta_2$ and $a_1/a_2$ of this preform were 0.82%, 0.10% and 0.21, respectively, from the distribution profile of the refractive index determined by using a preform analyzer in good coincidence with the respective target values. FIG. 4 of the accompanying drawing is a graph showing $\lambda_0$ and $d\lambda_0/dk$ each as a function of k, from which the value of $\lambda_0$ could be 1550 nm at k=0.299 where $d\lambda_0/dk$=−338 or at k=0.335 where $d\lambda_0/dk$=−329. In consideration of the bending characteristics, the value of k=0.335 was selected as the target value for the outer deposition to complete the cladding layer.

The average value of the parameter k over the whole body of the secondary preform was just 0.335 as calculated from the weight increase of the thus completed secondary preform over the primary preform.

Figure 5:
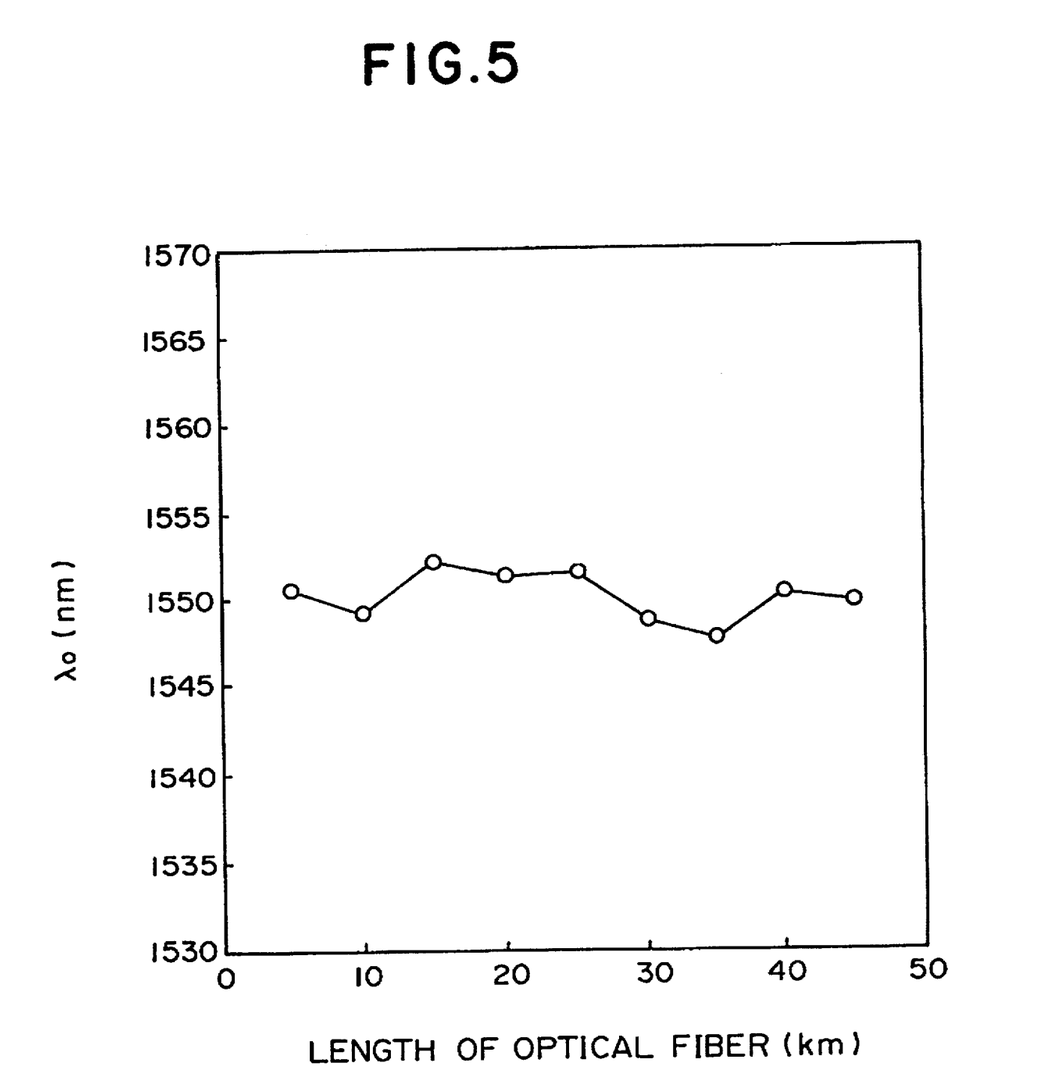
FIG. 5 is a graph showing the distribution of $\lambda_0$ along the length of the optical fiber obtained by drawing the preform prepared in Example 1.

The thus obtained preform was drawn to give an optical fiber of which the zero-dispersion wavelength $\lambda_0$ along the longitudinal direction was determined over the whole length to give the results shown in FIG. 5 which is a graph showing the distribution of $\lambda_0$ in the longitudinal direction of the optical fiber. The variation in $\lambda_0$ was very small with a largest value and a smallest value of 1552.1 nm and 1547.5 nm, respectively.

EXAMPLE 2

Figure 6:
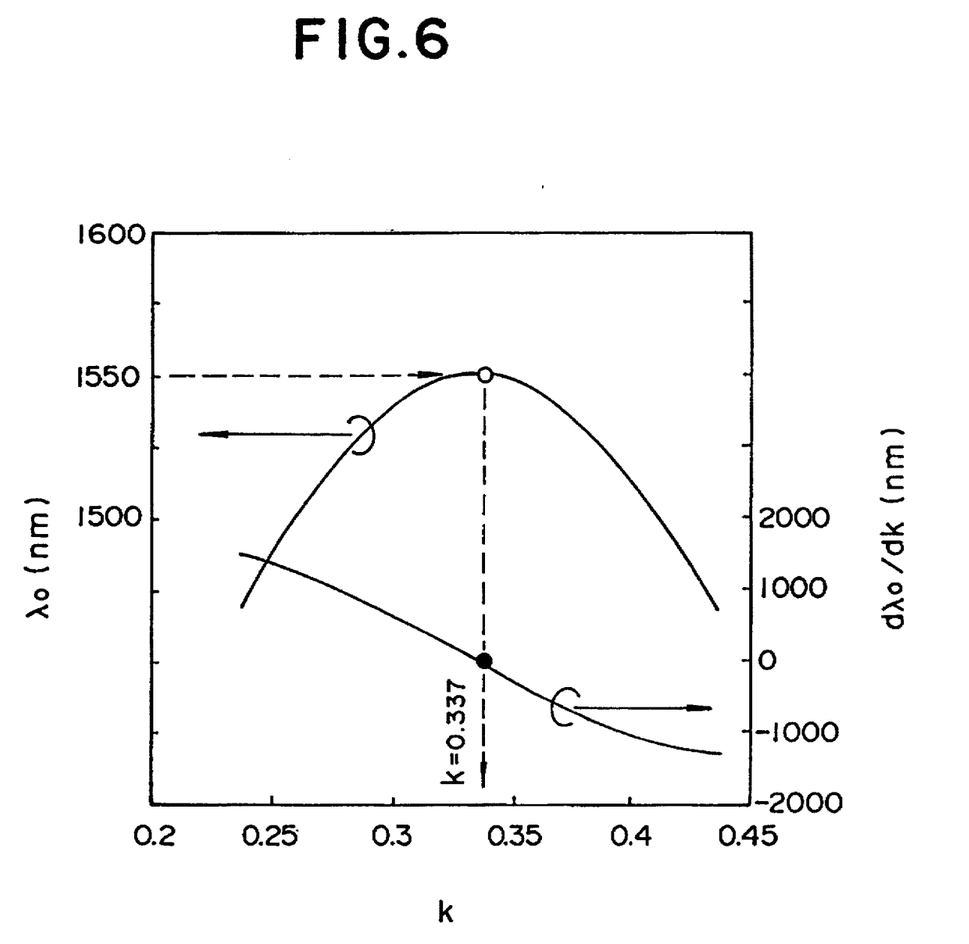
FIG. 6 is a graph showing $\lambda_0$ and $d\lambda_0/dk$ each as a function of the parameter k in the preform prepared in Example 2.

Based on the example shown in FIG. 1, $\Delta_2$ and $a_1/a_2$ as the parameters for the distribution profile of the refractive index were selected to be 0.14% and 0.22, respectively, with the value of $\Delta_1$ unchanged at 0.91%. The actual values of the parameters $\Delta_1$, $\Delta_2$ and $a_1/a_2$ of the preform prepared with these target values were 0.91%, 0.14% and 0.22, respectively, to be in good coincidence with the target values as calculated from the distribution profile of the refractive index determined by using a preform analyzer. FIG. 6 of the accompanying drawing is a graph showing $\lambda_0$ and $d\lambda_0/dk$ each as a function of k, from which the value of $\lambda_0$ could be 1550 nm at k=0.337 where $d\lambda_0/dk$=0 so that this value of k was taken as the target value in the outer deposition process for the cladding layer.

The average value of the parameter k over the whole body of the secondary preform was 0.235 as calculated from the weight increase of the thus completed secondary preform over the primary preform.

Figure 7:
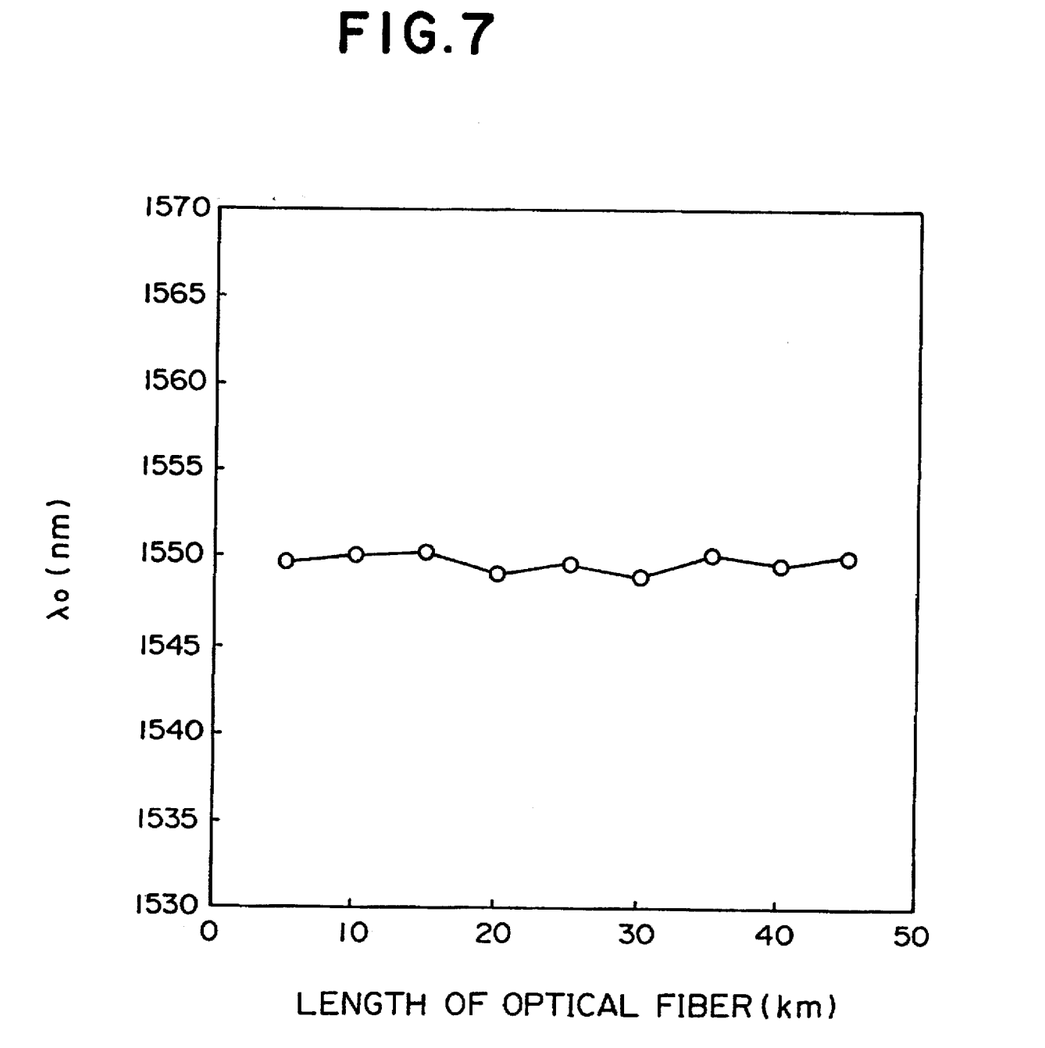
FIG. 7 is a graph showing the distribution of $\lambda_0$ along the length of the optical fiber obtained by drawing the preform prepared in Example 2.

The thus obtained preform was drawn to give an optical fiber of which the zero-dispersion wavelength $\lambda_0$ along the longitudinal direction was determined over the whole length to give the results shown in FIG. 7 which is a graph showing the distribution of $\lambda_0$ in the longitudinal direction of the optical fiber. The variation in $\lambda_0$ was extremely small with a largest value and a smallest value of 1550.2 nm and 1548.8 nm, respectively.

COMPARATIVE EXAMPLE

A primary preform was prepared with the same target values of the parameters for the distribution profile of the refractive index just as shown in FIG. 1, namely, with $\Delta_1$=0.91%, $\Delta_2$=0.10% and $a_1/a_2$=0.21. The distribution profile of the refractive index was determined in the preform as prepared and $\lambda_0$ and $d\lambda_0/dk$ were calculated therefrom to give the results shown in FIG. 1 each as a function of k, from which the value of $\lambda_0$ could be 1550 nm at k=0.250 where $d\lambda_0/dk$=1158.07 or at k=0.386 where $d\lambda_0/dk$=−1090.8. In consideration of the bending characteristics, the value of k=0.386 was selected as the target value for the outer deposition to complete the cladding layer.

Figure 8:
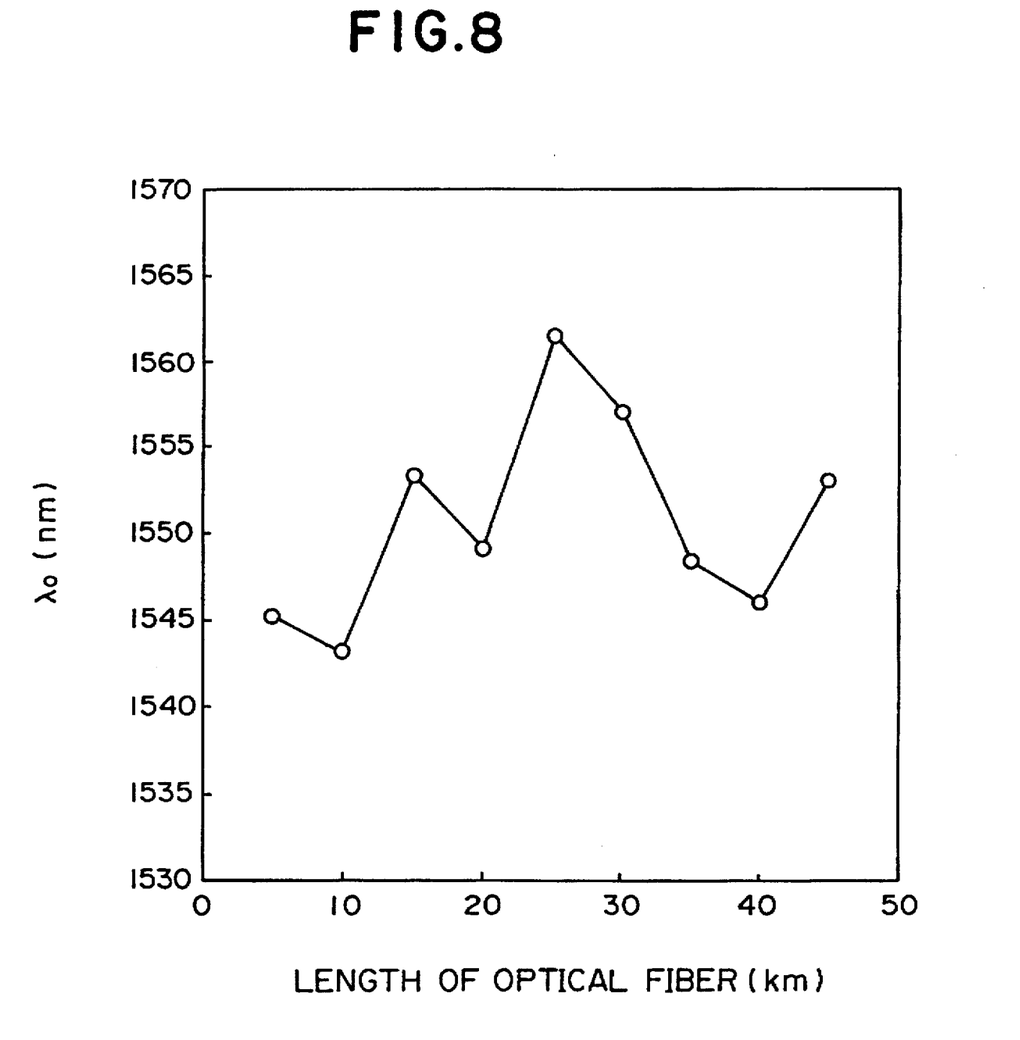
FIG. 8 is a graph showing the distribution of $\lambda_0$ along the length of the optical fiber obtained by drawing the preform prepared in Comparative Example.

The actually prepared preform was drawn to give an optical fiber of which the zero-dispersion wavelength $\lambda_0$ along the longitudinal direction was determined over the whole length to give the results shown in FIG. 8 which is a graph showing the distribution of $\lambda_0$ in the longitudinal direction of the optical fiber. The variation in $\lambda_0$ was relatively large with a largest value and a smallest value of 1561.4 nm and 1543.1 nm, respectively.

What is claimed is:

1. In a method for the preparation of a silica glass-based preform for optical fibers comprising the steps of forming an outer core of silica glass on and around a center core of silica glass, the outer core having a refractive index smaller than the refractive index of the silica glass forming the center core, to provide a primary preform having a diameter $D_1$ and having a refractive index distribution profile across the diameter, and forming a cladding layer of silica glass on and around the primary preform, the cladding layer having a refractive index smaller than that of the outer core, to provide a secondary preform having a diameter $D_2$, the improvement which comprises forming the cladding layer in such a way that the inequality $$|d\lambda_0/dk| \leq 500 \text{ nm}$$

is satisfied, in which k is the ratio of $D_1/D_2$ and $\lambda_0$ is the zero-dispersion wavelength in nm of an optical fiber obtained by drawing the secondary preform, $d\lambda_0/dk$ being a derivative of the equation $\lambda_0$=f(k).

* * * * *